US012355646B2

(12) United States Patent
Abhishek et al.

(10) Patent No.: US 12,355,646 B2
(45) Date of Patent: Jul. 8, 2025

(54) DISTRIBUTED LEDGER FOR APPLICATION HEALTH MONITORING

(71) Applicant: Wells Fargo Bank, N.A., San Francisco, CA (US)

(72) Inventors: Somnath Abhishek, Hyderabad (IN); Burramukkala Ravindranath Reddy, Hyderabad (IN); Prasanna Khobragade, Hyderabad (IN); Sai Prakash Garla, Hyderabad (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/523,321

(22) Filed: Nov. 29, 2023

(65) Prior Publication Data
US 2025/0175403 A1    May 29, 2025

(51) Int. Cl.
*G06F 15/173*    (2006.01)
*H04L 12/18*    (2006.01)
(Continued)

(52) U.S. Cl.
CPC ...... *H04L 43/0817* (2013.01); *H04L 12/1895* (2013.01); *H04L 41/0893* (2013.01)

(58) Field of Classification Search
CPC ............. H04L 43/0817; H04L 12/1895; H04L 41/0893
See application file for complete search history.

(56) References Cited

U.S. PATENT DOCUMENTS 7,210,145 B2    4/2007    Srinivasan
7,512,841 B2    3/2009    Walker et al.
(Continued)

FOREIGN PATENT DOCUMENTS

CN    111835872 B    12/2020
JP    3322302 B2    9/2002
(Continued)

OTHER PUBLICATIONS

Aggour et al., "Colt: concept lineage tool for data flow metadata capture and analysis", Proceedings of the VLDB Endowment, vol. 10, No. 12, VLDB Endowment, Aug. 1, 2017, pp. 1790-1801.
(Continued)

*Primary Examiner* — Duyen M Doan
(74) *Attorney, Agent, or Firm* — Shumaker & Sieffert, P.A.

(57) ABSTRACT

This disclosure describes techniques for application health monitoring using distributed ledger technology in a computing system that includes a plurality of nodes providing application services. For example, the techniques include obtaining health indicators of a particular application service by a computing system. The computing system causes a consensus system that includes a particular node executing the particular application service to vote and verify the status of the node. Based on the verification of the status of the particular node, the consensus system writes an entry to a distributed ledger regarding the status of the particular node. The computing system reads the entry of the distributed ledger and generates a ticket based on the entry. The computing system adds the ticket to a network queue for broadcasting within the computing system.

20 Claims, 5 Drawing Sheets

(51) Int. Cl.
*H04L 41/0893* (2022.01)
*H04L 43/0817* (2022.01)

(56) References Cited

U.S. PATENT DOCUMENTS

| | | |
|---|---|---|
| 7,734,960 B2 | 6/2010 | Mandal |
| 8,605,601 B2 | 12/2013 | Isaksson et al. |
| 9,104,543 B1 | 8/2015 | Cavanagh et al. |
| 9,772,920 B2 | 9/2017 | Kizhakkiniyil et al. |
| 9,823,641 B2 | 11/2017 | Senda et al. |
| 10,075,384 B2 | 9/2018 | Shear et al. |
| 11,003,645 B1 | 5/2021 | Thompson et al. |
| 11,030,248 B2 | 6/2021 | Borochoff et al. |
| 11,146,640 B2 | 10/2021 | Rath et al. |
| 11,238,448 B1* | 2/2022 | Narayanan ............ G06Q 20/127 |
| 11,438,250 B2 | 9/2022 | Venkatesh et al. |
| 2006/0087976 A1 | 4/2006 | Rhodes et al. |
| 2017/0295232 A1* | 10/2017 | Curtis ..................... G06F 16/27 |
| 2019/0089611 A1 | 3/2019 | Kondalam et al. |
| 2019/0149418 A1* | 5/2019 | Bertsche ............ G06F 16/1734 707/625 |
| 2019/0318338 A1* | 10/2019 | Verma ................... H04L 9/0637 |
| 2020/0389495 A1 | 12/2020 | Crabtree et al. |
| 2021/0144517 A1 | 5/2021 | Bernat et al. |
| 2022/0035693 A1* | 2/2022 | Jiang ................... G06F 16/2379 |
| 2022/0350734 A1 | 11/2022 | Coutinho Moraes et al. |
| 2022/0398173 A1* | 12/2022 | Rodriguez Bravo ........................ G06F 11/2023 |

FOREIGN PATENT DOCUMENTS

| | | |
|---|---|---|
| WO | 200545559 A2 | 5/2005 |
| WO | 2007123527 A1 | 11/2007 |
| WO | 2021206704 A1 | 10/2021 |

OTHER PUBLICATIONS

Medvedev et al., "Gaining Insights into Conceptual Models: A Graph-Theoretic Querying Approach", Applied Sciences, vol. 11, No. 2, Jan. 14, 2021, 29 pp.

Jahromi et al., "Towards Application-Aware Networking: ML-Based End-to-End Application KPI/QoE Metrics Characterization in SDN", Tenth International Conference on Ubiquitous and Future Networks, IEEE, Jul. 3, 2018, 6 pages.

Benet et al., "IPFS is an open system to manage data without a central server", Github, Feb. 28, 2024, 2 pp., URL: https://github.com/ipfs/ipfs.

* cited by examiner

DISTRIBUTED LEDGER FOR APPLICATION HEALTH MONITORING

TECHNICAL FIELD

This disclosure relates to computing systems and, in various examples, to verifying and sharing of application status.

BACKGROUND

Datacenters often include a number of servers that provide an execution environment for compute nodes. Each compute node may execute one or more services, such as microservices, and exchange data with other compute nodes within the datacenter. A particular compute node may be interrelated with other compute nodes through downstream and upstream application dependencies.

SUMMARY

In general, this disclosure describes techniques for application health monitoring using distributed ledger technology in a computing system having a microservices architecture that includes a plurality of nodes providing a plurality of self-aware application services. The disclosed techniques include obtaining health indicators of a particular application service on a particular node from a logical group of nodes in communication with the particular application service and verifying a self-reported status (e.g., reduced functionality) of the particular application service based on whether the health indicators obtained from the logical group of nodes satisfies a consensus threshold. The techniques enable verification of the status of the application service through voting by the logical group of nodes. If the status is verified (i.e., the consensus threshold is satisfied by the votes meeting the consensus threshold), an indication of the verified status (e.g., a failure indication or indication or reduced functionality) for the application service may be written to an entry in the distributed ledger maintained by the logical group of nodes. The indication of the verified status of the application service is also broadcast across the plurality of nodes.

The computing system may include a distributed ledger controller configured to define the distributed ledger for each consensus system comprising a logical group of nodes. For example, the distributed ledger controller may determine a consensus threshold for a consensus system based on the criticality of the application service. The distributed ledger control may raise or lower the consensus threshold for a particular application service based on a predetermined criticality of the application service. The distributed ledger controller may base the criticality on one or more factors such as the number of upstream and downstream dependencies of the application service, the type of functionality provided by the application of which the application service is a part, and whether there are other instances of the application service available to replace the functionality of the application service experiencing reduced functionality.

The computing system may read entries from the distributed ledger. Based on reading an entry that indicates that the particular application service is experiencing reduced functionality, the computing system adds a support ticket to a queue that broadcasts support tickets across the plurality of nodes. Further, the computing system may generate data representative of a dashboard user interface that displays one or more visual elements including status indicators for the plurality of application services and, in some examples, criticality indicators for the plurality of application services.

The techniques of this disclosure may provide one or more technical advantages that may be used to realize practical advantages. For example, nodes in a logical group that includes a particular application service may be able to verify a self-reported status of the particular application service. The disclosed techniques may enable the computing system to automatically identify application services that are experiencing reduced functionality and report a failure indication to other nodes and devices in the network topology and a network administrator. In this way, consensus systems made up of the nodes themselves may determine reduced functionality of application services without requiring a network administrator to establish collection of data from the nodes via APIs and analysis of the data to identify the reduced functionality of application services executed on the nodes. As another example, the disclosed techniques include recording of application service statuses and metadata regarding the criticality of the application service to a distributed ledger. As such, the disclosed techniques may enable prioritized remediation of application services via an automated support ticket process. For example, the computing system may prioritize broadcasting of a support ticket for a particular application service based on the metadata included in the ledger indicating the criticality of the particular application service.

In one example, a method includes obtaining, by a computing system comprising a plurality of nodes arranged in a network topology, the plurality of nodes providing a plurality of application services, an indication that a particular application service of the plurality of services provided by a particular node of the plurality of nodes is experiencing reduced functionality; determining, by the computing system, a logical group of nodes of the plurality of nodes that are in communication with the particular application service provided by the particular node, wherein the logical group of nodes includes the particular node; obtaining, by the computing system, a health indicator for the particular application service from each node of the logical group of nodes; verifying, by the computing system, that the particular application service provided by the particular node is experiencing reduced functionality based on a determination that health indicators for the particular application service obtained from the logical group of nodes satisfy a consensus threshold; and broadcasting, by the computing system across the plurality of nodes, a failure indication for the particular service provided by the particular node.

In another example, a computing system includes a plurality of nodes arranged in a network topology, where the nodes provide a plurality of application services, the computing system including: memory, and processing circuitry in communication with the memory, the processing circuitry configured to: obtain an indication that a particular application service of the plurality of application services provided by a particular node of the plurality of nodes is experiencing reduced functionality; determine a logical group of nodes of the plurality of nodes that are in communication with the particular application service provided by the particular node, wherein the logical group of nodes includes the particular node; obtain a health indicator for the particular application service from each node of the logical group of nodes; verify that the particular application service provided by the particular node is experiencing reduced functionality based on a determination that health indicators for the particular application service obtained from the logical group of nodes satisfy a consensus threshold; and broadcast, across the plurality of nodes, a failure indication for the particular service provided by the particular node.

In another example, computer-readable media includes instructions that, when executed, cause processing circuitry of a computing system including a plurality of nodes arranged in a network topology to: obtain an indication that a particular application service of a plurality of application services provided by a particular node of the plurality of nodes is experiencing reduced functionality; determine a logical group of nodes of the plurality of nodes that are in communication with the particular application service provided by the particular node, wherein the logical group of nodes includes the particular node; obtain a health indicator for the particular application service from each node of the logical group of nodes; verify that the particular application service provided by the particular node is experiencing reduced functionality based on a determination that health indicators for the particular application service obtained from the logical group of nodes satisfy a consensus threshold; and broadcast, across the plurality of nodes, a failure indication for the particular service provided by the particular node.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

Like reference characters denotes like elements throughout the text and figures.

DETAILED DESCRIPTION

Figure 1:
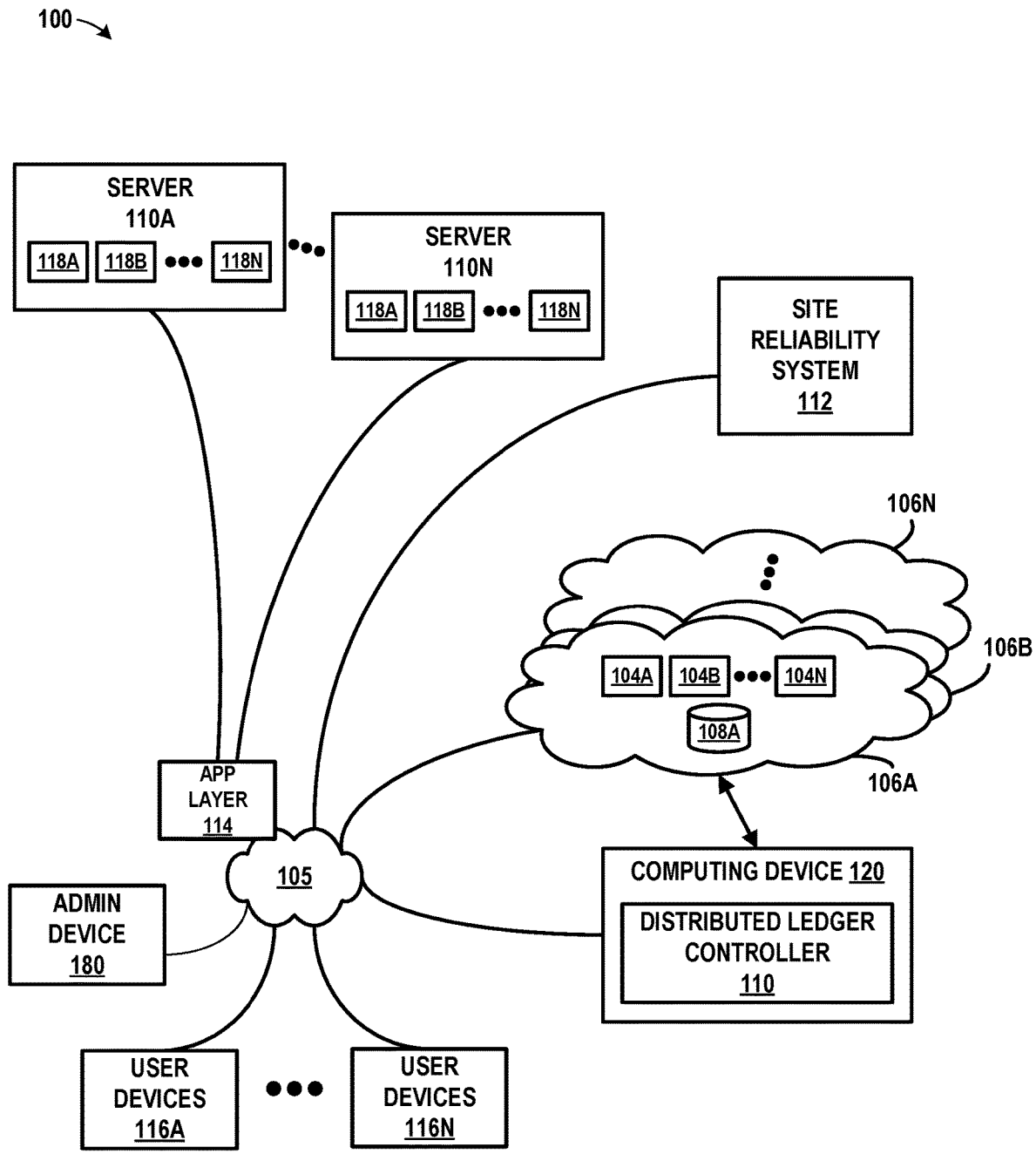
FIG. 1 is a conceptual diagram illustrating an example computing system comprising a plurality of nodes arranged in a network topology and that are included in one or more consensus systems for application health monitoring, in accordance with one or more techniques of this present disclosure.

FIG. 1 is a conceptual diagram illustrating a computing system 100 comprising a plurality of nodes arranged in a network topology and that are included in one or more consensus systems for application health monitoring, in accordance with one or more techniques of this present disclosure. In FIG. 1, computing system 100 includes representations of a number of user devices, entities, and systems capable of communicating over network 105. For example, network 105 interconnects one or more devices within computing system 100 such as servers 110A-110N (hereinafter "servers 110") that each execute one or more application services such as application services 118A-118N (hereinafter "application services 118").

Servers 110 may include one or more computing devices capable of executing one or more applications. For example, server 110A may be a rack-mount server within a datacenter that executes multiple applications and compute nodes that underpin the applications. Servers 110 may be interconnected via network 105 across a single facility or across multiple facilities. Servers 110, in some examples, may collectively provide a distributed computing environment for one or more applications.

Servers 110 execute application services 118. Servers 110 may execute applications that are composed of multiple application services of application services 118. For example, server 110A may execute several application services that comprise a single application such as a financial information collector. Servers 110 may execute application services that are microservices that provide functionality for an application.

Computing system 100 includes user devices 116A-116N (hereinafter "user devices 116"). User devices 116 may be laptops, desktops, tablet computers, cellphones, virtual machines, and other types of computing devices. User devices 116 may access servers 110 and interact with applications provided by application services 118. For example, user devices 116 may interact with an application executed by servers 110 that provides information regarding bank accounts associated with users of user devices 116.

Servers 110, and application services 118, may communicate with other processes and computing devices via application (App) layer 114. App layer 114 may represent an interconnection to a layer of a compute stack on which application services 118 reside. For example, user device 116A may communicate with server 110B via network 105 and access the functionality of application service 118A via app layer 114.

Servers 110 may execute application services 118 on nodes that include self-aware functionality. For example, server 110A may execute application service 118A on a node that includes a self-aware component or plugin that monitors the performance of application service 118A and determines whether application service 118A is experiencing reduced functionality. The self-aware components may, in response to determining that application service 118A is experiencing reduced functionality, generate an indication of reduced performance of the application service. The self-aware components may generate an indication that includes additional information such as an identifier of the application service experiencing reduced functionality. The self-aware components of a node may generate and provide the indication of reduced functionality to other devices and processes of computing system 100. For example, the self-aware components of a node may generate and provide an indication of reduced functionality to computing device 120. In another example, the self-aware components may generate an indication that include information regarding the type of reduced functionality and provide it to site reliability system 112.

Application services 118 may experience reduced functionality that impacts the functionality of applications executed by servers 110. Application services 118 may experience reduced functionality such as increased latency, loss of communication, reduced compute performance, and other reduced functionality. Application services 118 may experience reduced functionality that results in reduced performance of the application composed of one or more of application services 118. In an example, application service 118A of server 110A experiences increased latency due to underlying network congestion that reduces the performance of application service 118A. In another example, application service 118B of server 110A experiences increased response times to calls due to over-allocation of resources of an underlying compute node of server 110A that is executing application service 118B. An application that relies upon application service 118A may experience reduced performance such as increased latency due to the latency experienced by application service 118A. In some examples, it may be time-consuming and challenging to identify that reduced performance of an application is due to the reduced performance of an application service such as application service 118B.

Computing system 100 may use one or more devices and/or processes, such as distributed ledger controller 110 executed by computing device 120, to identify nodes in a logical group of nodes that includes the node executing the application service that is experiencing reduced functionality. Computing device 120 may be a server, desktop computer, virtualized computing device, or other type of computing device configured to execute distributed ledger controller 110. Distributed ledger controller 110 may be a process or program configured to initialize, identify, and configure consensus systems 106 and corresponding ledgers 108. For example, distributed ledger controller 110, responsive to receiving an indication of reduced performance from a self-aware application service, may identify a logical group of nodes for a consensus system that includes the node executing the application service that is experiencing reduced functionality. In another example, a self-aware component of application service 118B provides an indication of reduced functionality to computing device 120 for consumption by distributed ledger controller 110. Distributed ledger controller 110 processes the indication of reduced functionality, and a consensus system that includes the node executing application service 118B.

Distributed ledger controller 110 may manage one or more consensus systems. In the example of FIG. 1, computing system 100 includes multiple consensus systems, such as consensus system 106A through consensus system 106N (collectively "consensus systems 106"). Consensus systems 106 may not be fixed in terms of composition and instead be dynamic, with members added and removed on an ongoing basis. Consensus systems 106 may be communicatively coupled to each other within a cloud computing environment or other type of distributed computing environment provided by servers 110. For example, consensus systems 106 may include one or more cloud computing environments that are interconnected by one or more public networks such as network 105. The computing environment of consensus systems 106 may be provided by servers 110.

Each of consensus systems 106 includes a plurality of nodes. For instance, consensus system 106A includes nodes 104A through 104N (collectively "nodes 104"), which may represent any number of nodes. Nodes 104 may represent compute nodes or worker nodes executed by servers 110 and that in turn execute application services 118. For example, server 110A may execute node 104A, which in turn executes application service 118B. In some examples, nodes 104 may represent or be implemented through one or more virtualized compute instances (e.g., virtual machines, containers) of a data center, cloud computing system, server farm, and/or server cluster. For instance, any or all of nodes 104A or nodes 104N may be implemented as Ethereum (or other blockchain) virtual machines. In some examples, nodes 104N are arranged in a network topology. Nodes 104 may represent compute nodes or worker nodes executed by servers 110 that provide an execution environment, such as a virtual machine for one or more application services. For example, server 110A may execute nodes 104A and 104N. In another example, server 110N executes node 104B, where node 104B executes application services 118A and 118N. Nodes 104 may communicate with the application services 118 via app layer 114 that facilitates access to the application layer of a computing stack that is underpinned by servers 110 and nodes 104.

Distributed ledger controller 110 may identify or initialize a consensus system from consensus systems 106 that includes the application service that is experiencing reduced functionality. Distributed ledger controller 110 may identify or initialize the consensus system based on receiving an indication of reduced functionality of an application service. In an example, a self-aware component executing on node 104A determines that application service 118B executed by node 104A is experiencing reduced functionality and provides an indication to distributed ledger controller 110. Distributed ledger controller 110, responsive to receiving the indication, identifies a consensus system that includes node 104A. In some examples, distributed ledger controller 110 may initialize a consensus system, where the selection of the nodes for the consensus system is based on the nodes that are in communication with or having dependencies on the particular application service. In another example, distributed ledger controller 110 receives an indication of reduced functionality from node 104A. Distributed ledger controller 110, responsive to determining that there is no consensus system that includes node 104A, initializes a consensus system that includes node 104A.

Each of consensus systems 106 implements one or more distributed ledgers. In the example shown, consensus system 106A includes distributed ledger 108A that is implemented, for example, by a blockchain, (e.g., a distributed ledger that includes a list of records, or blocks, securely linked via cryptographic hashes, where each block includes a cryptographic hash of the previous block, a timestamp, and transaction data). Distributed ledger 108A may be implemented as a data store included in multiple (or all) nodes 104 within consensus system 106A. Consensus systems 106 (that is, the remainder of the consensus systems through consensus system 106N) may be implemented in a similar manner, so that each of consensus systems 106 includes one or more distributed ledgers 108 (e.g., consensus system 106N includes distributed ledger 108N). In general, each node within a respective consensus system 106 (or a significant fraction of the nodes) includes a copy (or at least a partial copy) of the distributed ledgers maintained by the respective consensus system 106.

Each of distributed ledgers 108 (e.g., included within each of consensus systems 106) may be shared transactional databases or data stores that include a plurality of blocks, each block (other than the root) referencing at least one block created at an earlier time, each block bundling one or more transactions registered within distributed legers 108, and each block cryptographically secured. Each of consensus systems 106 may receive transactions from transaction senders (e.g., computing devices external or internal to each of consensus systems 106) that invoke functionality of distributed ledgers 108 to modify a given distributed ledger 108 stored within a consensus system. Each of consensus systems 106 uses the distributed ledger 108 stored within the consensus system for verification of transactions. Each block of a distributed ledger typically contains a hash pointer as a link to a previous block, a timestamp, and the transaction data for the transactions. By design, distributed ledgers 108 are inherently resistant to modification of previously-stored transaction data. Functionally, each of distributed ledgers 108 serves as a ledger, distributed across many nodes of a consensus system, that can record transactions between parties efficiently and in a verifiable and permanent way. Distributed ledgers may include a decentralized, content-addressable data store such as InterPlanetary File System ("IPFS"). A decentralized data store is a decentralized file system in which operators hold a portion of the overall data. Additional examples of a decentralized, content-addressable data store, such as IPFS, is described in https://github.com/ipfs/ipfs, the entire contents of which is incorporated by reference herein. A decentralized data store may store data similar to that of distributed ledgers 108.

Nodes 104 of each of consensus systems 106 may implement one or more distributed ledgers 108 as part of the consensus systems 106. Each of consensus systems 106 may be a peer-to-peer network that manages one or more distributed ledgers 108 by collectively adhering to a consensus protocol and/or performing operations corresponding to various device identification-related or network-compliance-related rules set. Nodes 104 adhere to the protocol and/or rules for validating new blocks. Once recorded, the data in any given block of distributed ledgers 108 cannot be altered retroactively without the alteration of all subsequent blocks and a collusion of at least some (e.g., typically a majority) of nodes 104 of the particular consensus system. For instance, with reference to consensus system 106A, the data in a block within distributed ledger 108A cannot be altered retroactively without also altering all subsequent blocks without agreement of a majority of nodes 104 of consensus system 106A.

Application services 118 that are upstream or downstream dependencies of a particular application service or are otherwise connected or related to the particular application service may verify whether the particular service is experiencing reduced functionality. Application services 118 may verify whether the particular application service is experiencing reduced functionality in response to receiving an indication of reduced performance from a self-aware component of the particular application service. Responsive to the reporting of reduced functionality by a particular application service of application services 118 to computing device 120 and/or site reliability system 112, distributed ledger controller 110 may identify or create a consensus system that includes the node executing the particular application service. For example, application service 118N executing on server 110A begins to experience reduced functionality and self-reports the reduced functionality to site reliability system 112. Distributed ledger controller 110 may identify consensus system 104B as including the node executing application service 118N and cause the nodes within consensus system 104B to verify the status of application service 118N. Distributed ledger controller 110 may identify consensus system 104B based on the nodes in communication with or having dependencies with application service 118N. In another example, site reliability system 112 receives an indication that application service 118B is experiencing reduced functionality. Distributed ledger controller 110 determines that the node executing application service 118B is not within any consensus system. Distributed ledger controller 110 configures a consensus system that includes the nodes within a logical group that includes the node executing application service 118B.

Nodes 104 within a consensus system 106 may vote to verify whether a particular application service is experiencing reduced functionality. Nodes 104 may determine whether the particular application service is experiencing reduced functionality in response to receiving an indication of reduced performance from a self-aware component of the particular application service. For example, application service 118N executing on node 104A begins to experience reduced functionality and self-reports the reduced functionality. Nodes 104B and 104C, which execute application services having dependencies with application service 118N, may determine whether application service 118N is experiencing reduced functionality.

Distributed ledger controller 110 may define consensus thresholds for the nodes 104 within consensus system 106. Distributed ledger controller 110 may define consensus thresholds that are thresholds of voting of nodes 104 as to the health of application services 118. Distributed ledger controller 110 may define consensus thresholds that are required to be reached by the voting of nodes 104 in order for a self-reported status of an application service to be verified as true. Distributed ledger controller 110 may define a default consensus threshold and, in some examples, may define a consensus threshold based on a criticality of an application service. In some examples, distributed ledger controller 110 may define a default consensus threshold that requires a majority of affirmative votes. In some other examples, distributed ledger controller 110 may define a default consensus threshold that is a supermajority for application services and, for application services with a relatively high criticality, a default consensus threshold that is a simply majority. Distributed ledger controller 110 may assign a criticality to an application service based on one or more of availability of duplicate application services of the particular application service provided by the plurality of nodes, a type of application associated with the particular application service, or a number of dependencies of the particular application service. In an example, distributed ledger controller 110 determines that application service 118B is a critical service for the functioning of an application. Distributed ledger controller 110 assigns a relatively low consensus threshold for application service 118B to ensure that any potential issues with application service 118B are more likely to be identified.

Nodes 104 may write health indicators of application services to distributed ledgers 108. Nodes 104 may write health indicators to a distributed ledger 108 that are the result of a verified consensus among the nodes 104 within a consensus system 106 corresponding to the distributed ledger that indicate one or more statuses of application services such as failure indicators. Nodes 104 may also write metadata associated with the health indicators for the application services to the distributed ledger, where the metadata may include an indication of the criticality of the application services. Nodes 104 may vote on whether a particular application service is experiencing reduced functionality. Nodes 104, responsive to completing a vote, may write a health indicator for the particular application service that is a verified consensus of the nodes within the consensus system to one or more blocks or entries of distributed ledgers 108. Nodes 104 may write the health indicator to one or more blocks or entries of distributed ledgers 108 for consumption by one or more devices or processes such as site reliability system 112. For example, nodes 104 may write an entry to a distributed ledger of distributer ledgers 108 that includes a failure indication for the particular application service. Nodes 104 may write a failure indication that indicates that the particular application service is experiencing reduced functionality or is experiencing a total loss of functionality.

Computing system 100 includes site reliability system 112. Site reliability system 112 may be a computing device or program executing with computing system 100. Site reliability system 112 may be configured to remediate application services 118 and provide alerts regarding reduced functionality to network administrators, admin device 180, and servers 110.

Site reliability system 112, responsive to reading an indication of reduced functionality of a particular application service from distributed ledgers 108, may generate a support ticket (alternatively referred to as "ticket" throughout) for the particular application service and add it to a queue of support tickets. In an example, site reliability system 112 may generate a support ticket in response to reading an indication of reduced functionality or a failure indication from distributed ledgers 108. Site reliability system 112 may maintain a queue of support tickets and broadcast tickets to one or more devices within computing system 100, such as servers 110 supporting application services 118, once the tickets reach the top of the queue. Site reliability system 112 may broadcast support tickets on a periodic schedule or based on the importance of the ticket. For example, site reliability system 112 may broadcast whichever ticket is at the top of the queue every 30 seconds. In another example, site reliability system 112 may promptly broadcast a ticket with a high criticality upon the ticket reaching the top of the queue instead of broadcasting the ticket according to a broadcast interval. In yet another example, site reliability system 112 may broadcast each ticket at the top of the queue as soon as the broadcasting of the previous ticket is complete.

Site reliability system 112 may place generated support tickets in different locations within the queue based on the importance of the application service. In an example, site reliability system 112 reads an indication from the one or more distributed ledgers indicating that application service 118B is experiencing reduced functionality and that application service 118 has a high criticality. Site reliability system 112 generates a support ticket that includes information regarding the importance of application service 118B and adds the support ticket near the top of the queue if the criticality is relatively high compared to the other support tickets currently in the queue. In another example, site reliability system 112 reads information of an application service that is of low importance/criticality from one of distributed ledgers 108. Site reliability system 112 adds a support ticket regarding the application service to the bottom of the queue.

Site reliability system 112, responsive to a ticket reaching the top of the queue, may broadcast information regarding the ticket to one or more computing devices such admin device 180 and servers 110. For example, site reliability system 112 may broadcast information to a device, e.g., admin device 180, associated with a network administrator who is assigned to manage the application to which the impacted application service belongs. In another example, site reliability system 112 broadcasts the ticket to servers 110, which enables servers 110 to take remedial actions such as rerouting calls away from the application service experiencing reduced functionality. Site reliability system 112 may broadcast information contained within the support ticket such as an identifier of the application service, the criticality of the application service, a remediation timeline of the application service (e.g., a predetermined period of time that the application service can remain impaired), dependencies of the application service, and other information.

Site reliability system 112 may generate a graphical use interface (GUI) that includes one or more visual elements that correspond to different elements of a visual dashboard for network administrators. Site reliability system 112 may generate a visual dashboard that includes visual indicators of network events, node status, service status, and other network statistics. For example, site reliability system 112 may generate a GUI that includes a visual representation of the topology of computing system 100 and visually indicates one or more dependencies among application services 118. In another example, site reliability system 112 may generate a GUI that includes a visual representation of the failure indication for the particular application service provided by the particular node and an indication of a criticality of the particular application service. In yet another example, site reliability system 112 may send data representative of the GUI to another computing device, such as an administrator device like admin device 180, for display to the administrator.

The self-aware components of application services 118 may generate an indication of remediation or restoration of functionality in response to be remediated or otherwise repaired. For example, a self-aware component of the node executing application service 118N may generate an indication in response to application service 118N being restarted and returning to full functionality. The self-aware component of application service 118N may provide the indication to site reliability system 112. Site reliability system 112, responsive to an indication regarding restoration of functionality from a particular application service, may cause the relevant consensus system to verify whether an application service has been restored to full functionality. For example, a consensus system of consensus systems 106 may cause its member nodes to vote on whether a particular application service has been restored to full functionality and verify whether the application service has been restored. The consensus system may obtain a second set of health indicators from the application services and verify whether the particular application service has been remediated. Based on the voting reaching the consensus threshold, the consensus system may write a second entry or indication to distributed ledgers 108 that includes a restoration indication for the particular application service, where the restoration indication is an entry subsequent to the first entry of the reduced functionality.

The techniques of this disclosure may provide one or more practical advantages. For example, the voting among nodes within a consensus system may enable faster and more accurate determinations of whether individual application services are fully functional than trying to identify impaired application services via streaming performance information via an API. In another example, the writing of entries to a distributed ledger regarding the functionality of application services enables the creation of a distributed and secure record of events regarding application services that is visible to many different devices and users within a computing system.

Figure 2:
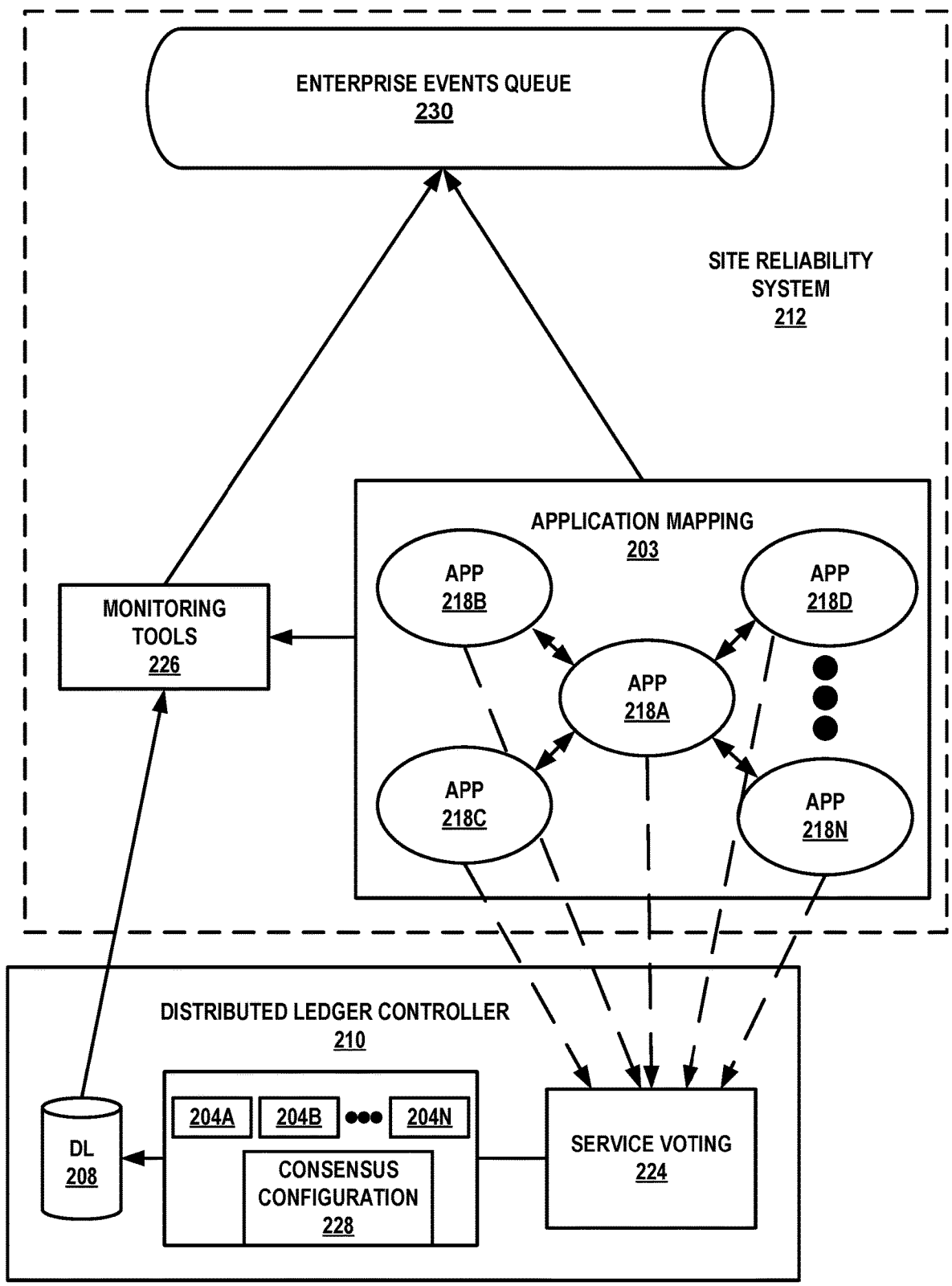
FIG. 2 is a conceptual diagram illustrating an example workflow of a computing system performing application health monitoring using distributed ledger technology, in accordance with one or more techniques of this disclosure.

FIG. 2 is a conceptual diagram illustrating an example workflow of a computing system performing application health monitoring using distributed ledger technology, in accordance with one or more techniques of this disclosure. FIG. 2 illustrates a workflow of one or more nodes voting regarding the status of an application service and writing the consensus to a distributed ledger, and a site reliability system broadcasting the status via an events queue.

FIG. 2 includes a site reliability system 212. Site reliability system 212 may be similar to site reliability system 112 as illustrated in FIG. 1 and perform similar actions. For example, site reliability system 212 may maintain one or more maps of application service dependencies such as application mapping 203. Application mapping 203 may include a network topology map. In addition, application mapping 203 may include one or more maps of application service dependencies within one or more applications. For example, a single application may comprise multiple application services that each have different dependencies on other application services within the single application. In some examples, site reliability system 212 may receive application mapping 203 from distributed ledger controller 210 when distributed ledger controller initially configures consensus systems of application services and identifies the nodes that underlie the application services. Site reliability system 212 may maintain application mapping 203 for use in identifying application services that are experiencing reduced functionality.

Application mapping 203 includes a mapping of application services 218A-218N (illustrated as "APP 218A-218N" in FIG. 2, hereinafter "application services 218"). Application services 218 may be application services or microservices that comprise an application or provide functionality for an application. For example, application services 218 may provide functionality for a financial services application used to obtain customer financial records from a database. In addition, application services 218 may depend upon and call each other to provide functionality for the application. For example, application service 218B may call application service 218A, which may in turn call application service 218N.

One or more of application services 218 may experience reduced functionality. For example, application service 218A may experience high latency when responding to requests. In another example, application service 218C may fully cease to function and stop responding to any requests or calls by other application services.

Application services 218 may be executed by nodes 204A-204N (hereinafter "nodes 204"). Nodes 204 may be similar to nodes 104 as illustrated in FIG. 1 and provide similar functionality. For example, nodes 204 may include self-aware components that monitor the performance of each node and the application services executed by the nodes. In an example, node 204C includes a self-aware component or plugin that monitors the performance of the application services executed by node 204C. The self-aware components of nodes 204 may generate an indication to reduced application performance in response to determining that an application service is experiencing reduced functionality. The self-aware components may then provide the indication to one or more devices such as site reliability system 112. For example, the self-aware components may provide the indication to monitoring tools 226 for consumption by site reliability system 212.

Nodes 204, responsive to an indication by a consensus system, may vote to verify whether the particular application service is experiencing reduced functionality in service voting 224. For example, node 204C may determine that an application service executed by node 204A is experiencing reduced functionality as the application service has been slow to respond to calls from another of nodes 204. Node 204C may vote, via the consensus system, that the application service is experiencing reduced functionality.

The consensus system may determine whether a consensus threshold has been reached among the votes by nodes 204 during service voting 224. The consensus system may use a consensus threshold set during the initialization of the consensus system by distributed ledger controller 210. Distributed ledger controller 210 may be a process or module executed by a computing device or system and may be similar to distributed ledger controller 110 as illustrated by FIG. 1. Distributed ledger controller 210 may configure and initialize consensus systems for nodes 204. For example, distributed ledger controller 210 may configure a consensus system that includes nodes 204A-204N and store information regarding the configuration in consensus configuration 228. Consensus configuration 228 may be a module or database configured to store information regarding the consensus systems. Distributed ledger controller 210 may update the information stored in consensus configuration 228 in response to one or more changes to a consensus system. For example, distributed ledger controller 210 may update consensus configuration 228 in response to initializing a new consensus system. In another example, distributed ledger controller may update consensus configuration 228 in response to a change in criticality for one or more of application services 218.

Distributed ledger controller 210, as part of configuring a consensus system, may assign consensus thresholds for voting by nodes based on the importance or criticality of the application service in question. In an example, distributed ledger controller 210 may assign a relatively high consensus threshold to an application service whose performance has minimal impact on the overall performance of an application. In another example, distributed ledger controller 210 may assign a relatively high consensus threshold to an application service of which there are multiple instances that calls can be redirected to. In yet another example, distributed ledger controller 210 may assign a relatively low consensus threshold to an application service of which there are no other instances and whose performance has a significant impact on the overall performance of the application to ensure that performance issues with the application do not go unnoticed. Distributed ledger controller 210 may provide the information regarding criticality to the consensus systems when configuring and initializing the consensus systems.

The consensus system, responsive to reaching the consensus threshold in service voting 224 and therefore verifying the status of an application service, writes an entry to distributed ledger 208 (illustrated as "DL 208" in FIG. 2). While illustrated as within distributed ledger controller 210, distributed ledger 208 may be distributed across one or more components of a computing system such as computing system 100 as illustrated in FIG. 1. Distributed ledger 208 may an instance of one or more distributed ledgers, where each distributed ledger is associated with a consensus system. In another example, distributed ledger 208 may be an example of a distributed ledger shared by multiple consensus systems. The consensus system may write an entry to an instance of distributed ledger 208 associated with the consensus system. In an example, responsive to a vote regarding the status of an application service by nodes 204 reaching the consensus threshold, the consensus system writes an entry to distributed ledger 208 for the consensus system, where the entry includes an identifier of the application service and an indicator of the importance/criticality of the application service such as metadata of the application service.

Site reliability system 212 may include one or more tools that read information regarding application services from distributed ledger 208 such as monitoring tools 226. Monitoring tools 226 may include one or more tools or processes or a collection of tools that read from entries or blocks of distributed ledger 208 and perform other actions based on the entry/block. Monitoring tools 226 may read from distributed ledger 208 to obtain information regarding the status of one or more of application services 218. Monitoring tools 226 may read information from distributed ledger 208 in response to determining that one or more consensus systems adding new information regarding an application service distributed ledger 208. The consensus system writes information such as an identifier of a particular application service, the status of the particular application service, the dependencies of the particular application service (e.g., which nodes and other application services depend from and communicate with the particular application service), the node on which the particular application service executes, the criticality of the particular application service, and other information regarding the particular application service. Monitoring tools 226 may read the information from distributed ledger 208 and process the information.

Monitoring tools 226, responsive to reading information from distributed ledger 208, may process the information and perform one or more actions. Monitoring tools 226 may generate a support ticket or other type of ticket that includes an indication that a particular application service requires remediation or other action. In an example, monitoring tools 226 read information from distributed ledger 208 that indicates that an application service requires remediation. Monitoring tools 226 generate a support ticket that includes an identifier of the application service, metadata of the application service, and other information related to the application service. Monitoring tools 226, based on the metadata of the application service from distributed ledger 208 that indicates the criticality of the application service, determines the importance/criticality (e.g., how important the application service is and how quickly it should be fixed) of the support ticket.

Monitoring tools 226, responsive to the generation of a support ticket, adds the support ticket to a queue such as enterprise events queue 230. Enterprise events queue 230 may be a software component or process of site reliability system 212 that maintains a queue of network events that are to be broadcasted throughout a network or computing system such as computing system 100 as illustrated in FIG. 1. Monitoring tools 226 may add a support ticket to the queue of events maintained by enterprise events queue 230. In some examples, monitoring tools 226 may change the relative location in enterprise events queue 230 that it adds a ticket based on the criticality of the application service and the expected remediation timeline of the application service. In an example, for a support ticket for an application service that is of high criticality and that has a relatively short deadline for remediation (e.g., an associated deadline that indicates that the application service can remain down for only a short period of time), monitoring tools 226 add the support ticket for the application service near the top of the queue of enterprise events queue 230. In another example, monitoring tools 226 generate a support ticket for an application service that is assigned a low criticality and a relatively longer deadline for remediation (e.g., an application service that is only run once a month), but that is estimated to be relatively simple to remediate (e.g., the application service only needs to be restarted in order to resume functioning normally). Monitoring tools 226, based on the low effort required to remediate the application service, places the support ticket for the application service near the top of enterprise events queue 230. In yet another example, monitoring tools 226 generate a support ticket for an application service that is assigned a low criticality and is estimated to take significant effort to remediate. Monitoring tools 226 add the support ticket for the application service near the bottom of the queue of enterprise events queue 230.

Enterprise events queue 230, responsive to a support ticket for an application service reaching the top of the queue, may broadcast the support ticket to one or more devices. Enterprise events queue 230 may periodically process support tickets and other items in the queue. For example, enterprise events queue 230 may process whichever ticket is currently at the top of the queue every 30 seconds and move the next respective ticket to the top of the queue to be processed. Enterprise events queue 230 may process the support ticket at the top of the queue and broadcast the information included in the support ticket. In an example, enterprise events queue 230 processes a support ticket for application service 218A that includes an identifier of application service 218A and metadata for application service 218 that includes information such as the criticality of application service 218A, a deadline to remediate application service 218A, and an estimation of the difficulty to remediate application service 218A. Enterprise events queue 230 may process the support ticket and broadcast the information regarding the support ticket to one or more devices such as servers 110 and admin device 180, as illustrated in FIG. 1.

Figure 3:
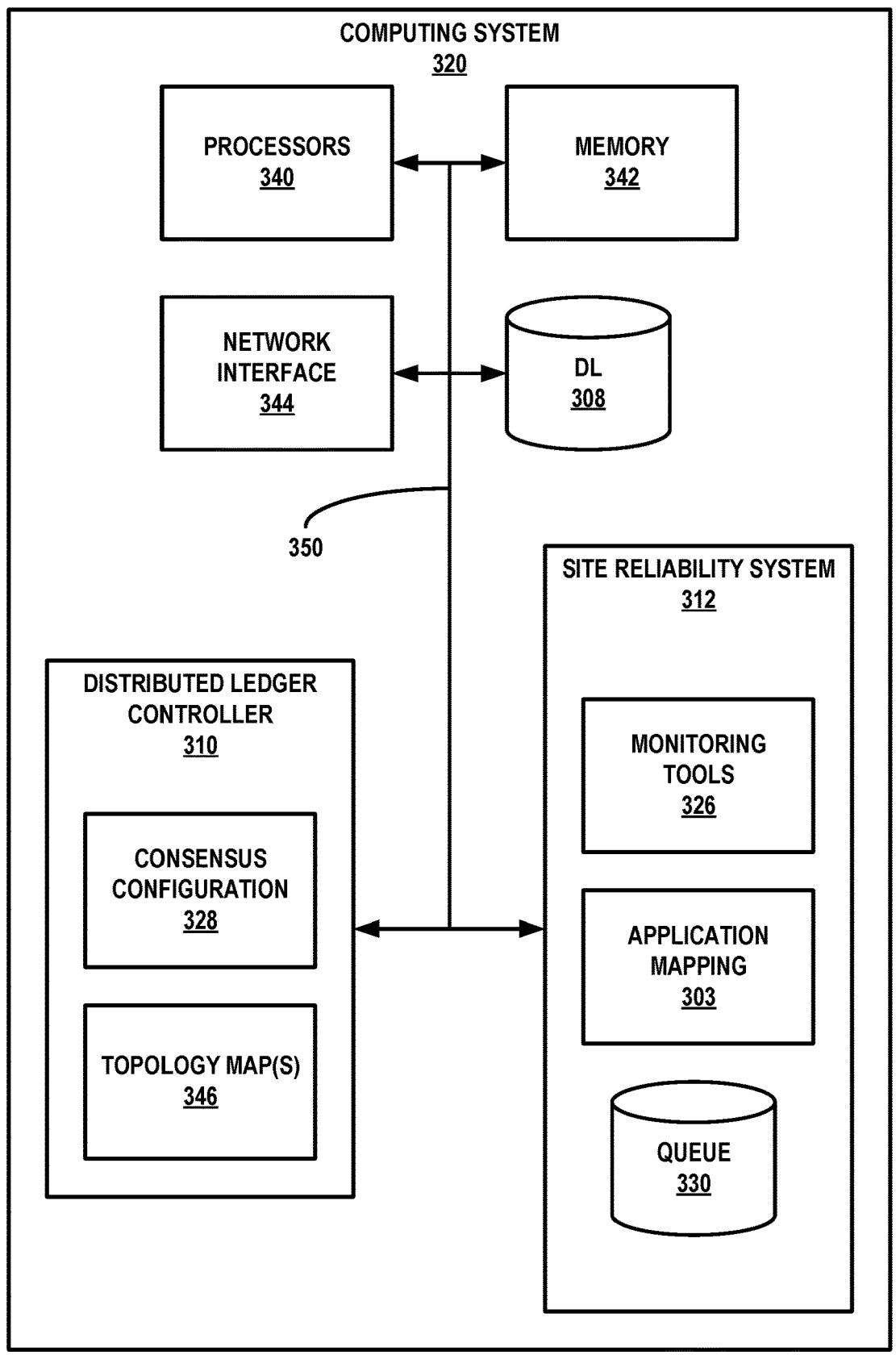
FIG. 3 is a block diagram illustrating an example computing system executing a distributed ledger controller and a site reliability system, in accordance with one or more techniques of this disclosure.

FIG. 3 is a block diagram illustrating a computing system 320 executing a distributed ledger controller 310 and a site reliability system 312, in accordance with one or more techniques of this disclosure. Computing system 320 may comprise one or more local or distributed computing devices, such as computing device 120 as illustrated in FIG. 1. Computing system 320 may comprise at least one computing device such as a server, desktop computer, virtualized computing environment, cloud computing environment, worker node, or other type of computing device or environment. Computing system 320 includes processors 340, memory 342, network interface 344, communication channels 350. In the illustrated example of FIG. 3, computing system 320 includes functional modules that are executable by processors 340, including distributed ledger controller 310 and site reliability system 312. Computing system 320, when executing distributed ledger controller 310, may perform similar functions as computing device 120 executing distributed ledger controller 110 from FIG. 1. In addition, computing system 320, when executed site reliability system 312, may perform similar functions as site reliability system 112 from FIG. 1.

Computing system 320 may include one or more processors such as processors 340. Processors 340 may include one or more processors such as a virtualized processor, multi-core processor, or other type of processor. Processors 340 may provide an execution environment for computing system 320 and execute instructions of programs of computing system 320. For example, processors 340 may execute instructions stored in memory 342.

Computing system 320 includes memory 342. Memory 342 may include one or more types of memory such as volatile memory and non-volatile memory. For example, memory 342 may include one or more types of volatile memory such as RAM, SD-RAM, and other types of memory that requires the flow of power to maintain the integrity of the data stored within. Further, memory 230 may include one or more types of non-volatile memory such as hard disk drives, solid state drives, tape drives, and other types of persistent memory. Memory 230 may store instructions for execution by processors 340. In addition, memory 230 may store data for one or more other components of computing system 320 such as data received via network interface 344.

Network interface 344 may include one or more types of network interfaces that may enable computing system 320 to communicate with other devices and processes over one or more networks. Network interfaces 344 may include one or more types of network interfaces such as network interfaces for Ethernet, fiber optic, and other types of network interfaces. Network interface 344 may enable computing system 320 to communicate with one or more servers over a network such as network 105 as illustrated in FIG. 1.

Computing system 320 includes communication channels 350. Communication channels 350 may provide a communications channel between one or more components of computing system 320. For example, communication channels 350 may interconnect processors 340 and memory 342. In another example, communication channels 350 may provide instructions for processors 340 to execute distributed ledger controller 310.

Computing system 320 may execute distributed ledger controller 310. Distributed ledger controller 310 may be similar to distributed ledger controller 110 as illustrated in FIG. 1 and distributed ledger controller 210 as illustrated in FIG. 2 and provide similar functionality. For example, distributed ledger controller 310 may be a program executed by computing system 320. Distributed ledger controller 310 includes consensus configuration 328 and topology maps 346.

Distributed ledger controller 310 includes topology maps 346. Distributed ledger controller 310 may store information about the configuration of one or more application services and the nodes that execute the application services in topology maps 346. In an example, topology maps 346 includes a topology map for an application, where the topology map indicates which application services such as application service 118A and 118B as illustrated in FIG. 1, are executed by which nodes, such as nodes 104A and 104B, respectively.

Distributed ledger controller 310 may use topology maps 346 to initialize consensus groups. Distributed ledger controller 310 may determine, based on information regarding the topology of a computing system, logical groups of nodes that are the basis for the consensus group. In an example, distributed ledger controller 310 determines a logical group of application services and nodes based on dependencies among the application services and interconnections between the nodes that execute the application services. Distributed ledger controller 310 may determine and initialize a consensus system in response to one or more nodes or application services starting up or in response to obtaining an indication that a particular application service is experiencing reduced functionality. Distributed ledger controller 310 configures one or more consensus groups. In some examples, distributed ledger controller 310 may cause the one or more application services and nodes to create a consensus group amongst themselves.

Distributed ledger controller 310 may store information regarding consensus groups in consensus configuration 328. Consensus configuration 328 may maintain a record of one or more consensus groups of a computing system. For example, consensus configuration 328 may maintain a record of a configuration of a consensus system that includes five application services and four nodes. Consensus configuration 328 may update the information of the consensus groups in response to the creation of a new consensus group by distributed ledger controller 310 or by the one or more nodes and application services. Consensus configuration 328 may update the information of the consensus groups in response to changes in the consensus group such as the removal of an application services or the shifting of an application service to a different consensus group.

Computing system 320 include site reliability system 312. Site reliability system 312 may be executed by computing system 320 or one or more other computing devices of computing system 100 as illustrated in FIG. 1. For example, site reliability system 312 and distributed ledger controller 310 may be executed or hosted by different computing systems or devices. Site reliability system 312 may include one or more components, processes, or software modules. Site reliability system 312 may interact with distributed ledger controller 310 and read information from distributed ledgers associated with various consensus systems. Site reliability system 312 includes application mapping 303, monitoring tools 326, and enterprise events queue 330 (illustrated as "QUEUE 330" in FIG. 3).

Site reliability system 312 executes application mapping 303. Application mapping 303 may include one or more maps of node and application services within computing system 100. Application mapping 303 may include similar information as topology maps 346 as well as information about application service dependencies. For example, application mapping 303 may include information about the upstream and downstream dependencies of one or more application services of a particular application and information about which nodes execute the application services of the particular application.

Site reliability system 312 executes monitoring tools 326. Monitoring tools 326 may be a process, module, or plugin executed by site reliability system 312 and configured to read from one or more distributed ledgers. Monitoring tools 326 may periodically read information from distributed ledger 308. While illustrated within the bounds of computing system 320, distributed ledger 308 may be distributed across one or more computing systems and computing devices. Distributed ledger 308 may be similar to distributed ledgers 108 as illustrated in FIG. 1 and include entries or blocks written to distributed ledger 308 from one or more consensus systems. For example, distributed ledger 308 may be a single distributed ledger or multiple distributed ledgers similar to distributed ledgers 108.

Monitoring tools 326 may read entries or blocks of distributed ledger 308 In an example, monitoring tools 326 may read entries from a single distributed ledger to which all of the consensus groups for a computing system writes entries to. In another example, monitoring tools 326 may read entries from one or more distributed ledgers, where each of the distributed ledgers is specific to a consensus system. Monitoring tools 326 may periodically check distributed ledger 308 according to a present schedule (e.g., check every 10 seconds to see if there is a new entry to the distributed ledgers). In some examples, monitoring tools 326 may read an entry of distributed ledger 308 in response to a new entry being written to distributed ledger 308 by a consensus system. Monitoring tools 326, responsive to reading an entry from a distributed ledger such as distributed ledger 308, may process the entry and generate a support ticket for broadcasting.

Site reliability system 312 may generate support tickets and add them to enterprise events queue 330 (illustrated as "QUEUE 330" in FIG. 3). Enterprise events queue 330 may be a software process executed by computing system 320 and configured to broadcast support tickets to one or more computing devices within computing system 100. For example, enterprise events queue 330 may broadcast a support ticket to one or more devices, such as the servers or nodes included in the associated consensus system and/or administrator devices, in response to the support ticket reaching the top of the queue.

Figure 4:
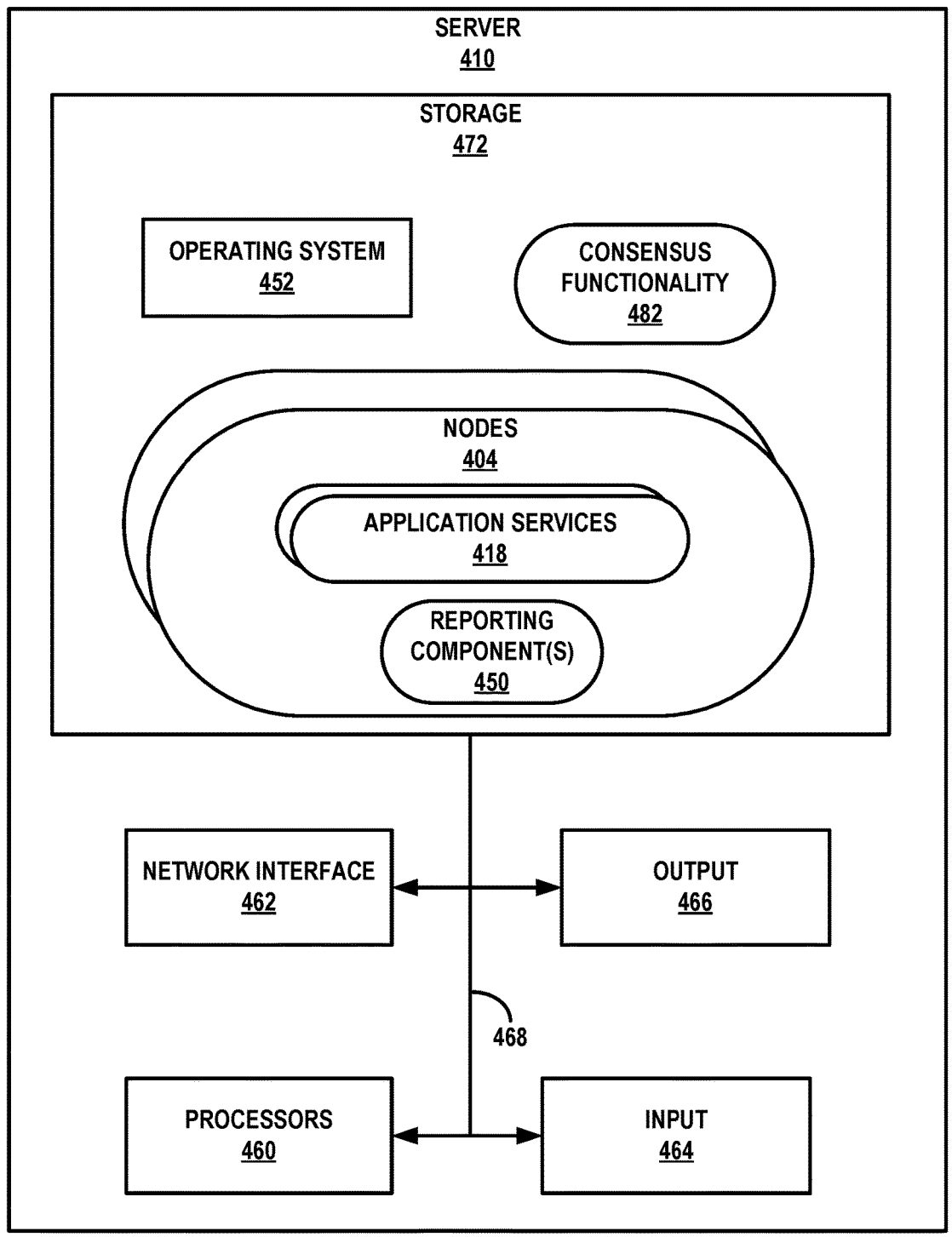
FIG. 4 is a block diagram illustrating an example server supporting one or more application services, in accordance with one or more techniques of this disclosure.

FIG. 4 is a block diagram illustrating an example server 410 supporting one or more application services 418, in accordance with one or more techniques of this disclosure. Server 410 may be similar to one or more of servers 110 as illustrated in FIG. 1. In some examples, server 410 may comprise one or more nodes that execute one or more processes.

Server 410 may be one or more types of computing devices such as a rack-mount server, virtual machine, virtualized computing environment, cloud computing device, desktop computer, or one or more computing device. Server 410 may include one or more components such as processors 460, network interface 462, input components 464 (illustrated as "INPUT 464" in FIG. 4), output components 466 (illustrated as "OUTPUT 466"), communication channels 468, and storage 472.

Server 410 includes processors 460. Processors 460 may include one or more processors such as a virtualized processor, multi-core processor, or other type of processor. Processors 460 may provide an execution environment for server 410 and execute instructions of programs of server 410.

Server 410 include network interface 462. Network interface 462 may include one or more network interfaces for one or more types of networks. For example, network interface 462 may include network interfaces for wired and wireless networks. In an example, network interface 462 may interconnect server 410 to a network such as network 105 as illustrated in FIG. 1 that interconnects one or more components of a computing system.

Server 410 includes input components 464 and output components 466. Server 410 may include input components 464 that enable a user to provide input to server 410. Server 410 may include one or more input components 464 such as touchscreens, mice, keyboards, microphones, and other input components. Server 410 may include one or more output components 466 such as displays, speakers, and other output components.

Server 410 include communication channels 468. Communication channels 468 may include one or more communication channels or interconnects between one or more components of server 410. For example, communication channels 468 may interconnect processors 460 and storage 472 and enable processors 460 to obtain information from storage 472 and execute instructions for one or more processes stored by storage 472.

Server 410 includes storage 472. Storage 472 may include one or more types of storage and store information and processes of storage 472. For example, storage 472 may include types of storage such as hard disk drives, solid state storage drives, and virtualized storage, among other types of storage. Storage 472 includes nodes 404, application services 418, reporting components 450, consensus functionality 482, and operating system 452 (hereinafter "OS 452").

Processors 460 may execute instructions of OS 452. OS 452 may be one or types of operating systems such as a server operating system. OS 452 may manage one or more processes executed by server 410 such as consensus system 406. For example, OS 452 may provide an execution environment for one or more processes such as application services 418.

Processors 460 may execute nodes 404. Nodes 404 may be one or more types of virtualized computing environments, worker nodes, compute nodes, or virtual machines. For example, a node of nodes 404 may be a Kubernetes pod configured to execute one or more workloads such as application services 418. Nodes 404 may communicate with each other and provide an execution environment for applications that are comprised of application services 418.

Nodes 404 may provide an execution environment for one or more processes such as application services 418. Application services 418 may include one or more processes that underpin an application executed by processors 460 of server 410. For example, server 410 may execute one or more applications that are comprised of one or more of application services 418. Application services 418 may include one or more application services that provide functionality for an application. Server 410 may execute one or more compute nodes, such as nodes 106 as illustrated in FIG. 1, to provide an execution environment for one or more application services of application services 418. For example, server 410 may execute a first node that executes four application services and a second node that executes a single application service.

Nodes 404 may execute reporting components 450. Reporting components 450 may be one or more processes, plugins, or modules of nodes 404. Reporting components 450 may enable self-aware functionality of nodes 404 and application services 418 that are executed by nodes 404. For example, reporting components 450 may monitor the performance of application services executed by nodes 404. Reporting components 450 may generate an indication reduced functionality of an application service and provide the indication of the reduced functionality to a site reliability system such as site reliability system 112 as illustrated in FIG. 1. Reporting components 450 may analyze and track one or more health metrics of application services 418 such as latency, resource utilization, network connection status, and other metrics. In addition, reporting components 450 may provide information regarding the reduced functionality such as an identifier and the type of reduced functionality to site reliability system 112.

Reporting components 450 may determine whether one or more health metrics of a respective application service of application services 418 indicate that the respective application service may be experiencing reduced functionality. Reporting components 450 may compare one or more health metrics to health metrics thresholds in order to determine whether an application service is experiencing reduced functionality. In some examples, reporting components 450 may use one or more types of analytics to analyze the health metrics to determine whether an application service is experiencing reduced functionality. Reporting components 450, based on determining that an application service is experiencing reduced functionality, may generate indications that the application service is experiencing reduced functionality and report the reduced functionality a computing system that manages the functionality of the one or more application services. In an example, an instance of reporting components 450 embedded in a particular application service determines that the particular application service is experiencing reduced functionality. The instance of reporting components 450 broadcasts an alert to one or more downstream and upstream dependencies of the particular application service.

Processors 460 may execute one or more processes the provide functionality for one or more consensus systems such as consensus functionality 482 Consensus functionality 482 may include one or more processes and network interfaces. Consensus functionality 482 may be integrated with the processes of nodes 404 and utilize communication protocols specific to a consensus system to communicate among the nodes of nodes 404. In some examples, consensus functionality 482 may enable communications as part of a consensus system with nodes executing on other computing devices or servers. The consensus system enables communication between the first and second application services via one or more communication channels with the consensus system.

Consensus functionality 482 may enable voting among constituent nodes on the health of a particular application services. Consensus functionality 482, responsive to an indication from reporting components 450 that a particular application service is experiencing reduced functionality, may cause one or more nodes withing a consensus system to vote on the status of the particular application service. Responsive to the voting by the nodes exceeding a consensus threshold, consensus functionality 482 causes consensus system to write an entry to a distributed ledger regarding the reduced functionality of the application service.

Figure 5:
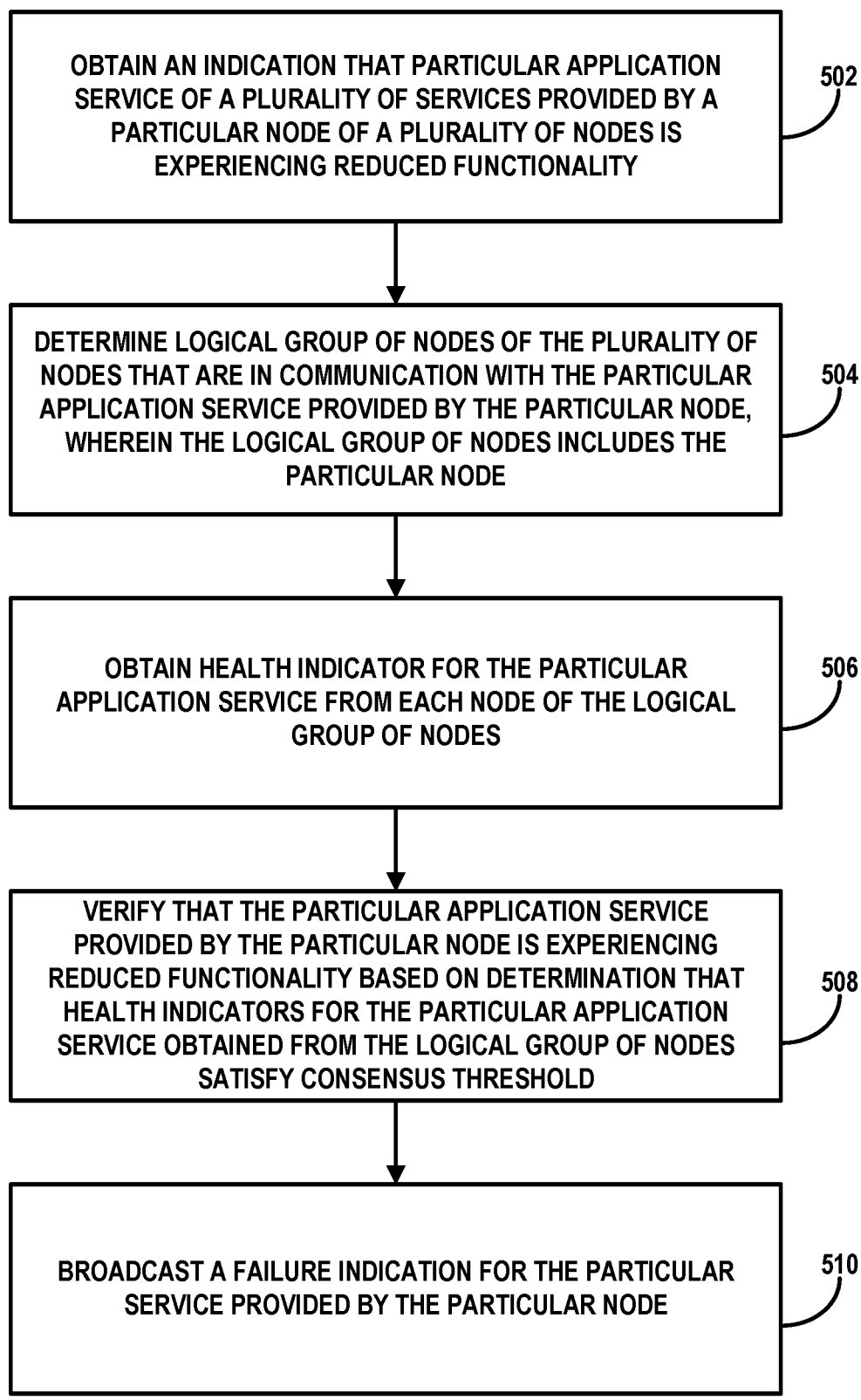
FIG. 5 is a flowchart illustrating an example operation of a computing system performing application health monitoring using distributed ledger technology, in accordance with one or more techniques of this disclosure.

FIG. 5 is a flowchart illustrating an example operation of a computing system performing application health monitoring using distributed ledger technology, in accordance with one or more techniques of this disclosure. For the purposes of clarity, FIG. 5 is described in the context of FIG. 1.

A computing system, such as computing system 100, obtains an indication that a particular application service of a plurality of services, such as application services 118, provided by a particular node of a plurality of nodes, such as nodes 104, is experiencing reduced functionality (502). Computing system 100 may comprise a plurality of nodes 104 that are arranged in a network topology. In addition, the plurality of nodes 104 may provide a plurality of application services. In an example, node 104B may provide application services 118A and 118B executed by server 110A. Computing system 100 may obtain an indication that a particular application service is experiencing reduced functionality from node of nodes 104. Computing system 100 may obtain an indication from a node that includes self-aware functionality that monitors the performance of application services executed by the node of nodes 104. For example, the self-aware functionality of a node may determine that an application service is experiencing reduced functionality based on one or more health metrics. The self-aware functionality of the node may generate an indication of the reduced functionality and provide it to one or more components of computing system 100 such as site reliability system 112 and/or computing device 120 as illustrated in FIG. 1.

Computing system 100 determines a logical group of nodes of the plurality of nodes 104 that are in communication with the particular application service provided by the particular node, wherein the logical group of nodes includes the particular node (504). Computing system 100 may determine the logical group of nodes based on one or more factors such as dependencies among the one or more application services executed by the nodes and network connections between the nodes. For example, computing system 100 may determine that nodes 104B and 104 are in the same logical group as a particular node such as node 104A. Computing system 100, based on determining the logical group of nodes, may initialize a consensus system that includes the nodes of the group of nodes. For example, computing system 100 may cause a computing device such as computing device 120 to initialize a consensus system that enables the nodes within the consensus system to communicate and vote on the status of an application service.

Computing system 100 obtains a health indicator for the particular application service from each node of the logical group of nodes (506). Computing system 100 may cause the consensus system, such as consensus system 106A, to obtain the health indicators for the particular application service. In some examples, a consensus system of consensus systems 106 that includes the node executing the particular application service may obtain health indicators in response to computing system obtaining the indication and causing the consensus system to vote and verify the status of the application service. Computing system 100 may cause the consensus system to obtain the health indicators as votes on the status of the particular application service.

Computing system 100 verifies that the particular application service provided by the particular node is experiencing reduced functionality based on a determination that health indicators for the particular application service obtained from the logical group of nodes satisfy a consensus threshold (508). Computing system 100 may verify that the particular application service is experiencing reduced functionality based on the consensus system writing an entry regarding that the consensus threshold has been reached to a distributed ledger. Computing system 100 may verify the status/health of the particular application service based on the votes satisfying a consensus threshold that is set based on the criticality of a particular application service. Computing system 100 may verify the status by reading entry written to the distributed ledger by the consensus system. For example, computing system 100 may read an entry or block that includes a health indicator of the particular application service indicating that the particular application service is experiencing reduced functionality.

Computing system 100 broadcasts a failure indication for the particular service provided by the particular node across the plurality of nodes 104 (510). Computing system 100 may broadcast the failure indication in response to reading an entry from the distributed ledger regarding the reduced functionality of the particular node. In some examples, computing system 100 may broadcast the failure indication in response to processing a support ticket regarding the particular application service reaching the top of a queue of network events.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

What is claimed is:

1. A method, comprising:
    obtaining, by a computing system comprising a plurality of nodes arranged in a network topology, the plurality of nodes providing a plurality of application services, an indication that a particular application service of the plurality of services provided by a particular node of the plurality of nodes is experiencing reduced functionality;
    determining, by the computing system, a logical group of nodes of the plurality of nodes that are in communication with the particular application service provided by the particular node, wherein the logical group of nodes includes the particular node;
    obtaining, by the computing system, a health indicator for the particular application service from each node of the logical group of nodes;
    verifying, by the computing system, that the particular application service provided by the particular node is experiencing reduced functionality based on a determination that health indicators for the particular application service obtained from the logical group of nodes satisfy a consensus threshold; and
    broadcasting, by the computing system across the plurality of nodes, an indication of reduced functionality for the particular service provided by the particular node.

2. The method of claim 1, wherein the logical group of nodes comprises nodes providing one or more application services that have upstream or downstream dependencies with the particular application service provided by the particular node.

3. The method of claim 1, wherein the logical group of nodes comprises a consensus system, and wherein the consensus threshold comprises a default consensus threshold of the consensus system.

4. The method of claim 1, further comprising assigning, by the computing system, a criticality of the particular application service based on one or more of:
    availability of duplicate application services of the particular application service provided by the plurality of nodes;
    a type of application associated with the particular application service; or
    a number of dependencies of the particular application service.

5. The method of claim 1, wherein the logical group of nodes comprises a consensus system, and wherein verifying that the particular application service is experiencing reduced functionality further comprises writing an entry in a distributed ledger maintained by the logical group of nodes that includes the indication of reduced functionality for the particular application service provided by the particular node.

6. The method of claim 5, wherein the entry in the distributed ledger further includes a criticality indication of the particular application service, wherein the criticality indication comprises one or more of profile information for the particular application service, a priority assigned to the particular application service, a weighting assigned to the particular application service, or a maximum duration of time for which the particular application service can be down.

7. The method of claim 5, further comprising:
    obtaining, by the computing system, a second indication that the particular application service provided by the particular node is experiencing restored functionality;
    obtaining, by the computing system, a second health indicator for the particular application service from each node of the logical group of nodes;
    verifying, by the computing system, that the particular application service provided by the particular node is experiencing restored functionality based on a determination that second health indicators for the particular application service obtained from the logical group of nodes satisfy the consensus threshold; and
    broadcasting, by the computing system across the plurality of nodes, a restoration indication for the particular application service provided by the particular node.

8. The method of claim 7, wherein the entry in the distributed ledger comprises a first entry, and wherein verifying that the particular application service is experiencing restored functionality further comprises writing a second entry in the distributed ledger maintained by the logical group of nodes that includes the restoration indication for the particular application service provided by the particular node, wherein the second entry is subsequent to the first entry in the distributed ledger.

9. The method of claim 1, further comprising generating data representative of a dashboard user interface for display on an administrator device associated with the network topology, wherein the dashboard includes the indication of reduced functionality for the particular application service provided by the particular node and an indication of a criticality of the particular application service.

10. The method of claim 1, wherein broadcasting the indication of reduced functionality for the particular application service provided by the particular node comprises:
    generating a support ticket corresponding to the indication of reduced functionality for the particular application service provided by the particular node; and
    pushing the support ticket to an event queue, wherein the event queue includes a plurality of support tickets associated with one or more of application services or nodes within the network topology, and wherein the event queue broadcasts a respective support ticket of the plurality of support tickets upon the respective support ticket reaching a top of the queue.

11. The method of claim 10, wherein each node of the plurality of nodes comprises an application executed on one or more computing devices, and wherein each application provides one or more application services of the plurality of application services.

12. A computing system comprising a plurality of nodes arranged in a network topology, where the plurality of nodes provide a plurality of application services, the computing system comprising:
- memory, and
- processing circuitry in communication with the memory, the processing circuitry configured to:
  - obtain an indication that a particular application service of the plurality of application services provided by a particular node of the plurality of nodes is experiencing reduced functionality;
  - determine a logical group of nodes of the plurality of nodes that are in communication with the particular application service provided by the particular node, wherein the logical group of nodes includes the particular node;
  - obtain a health indicator for the particular application service from each node of the logical group of nodes;
  - verify that the particular application service provided by the particular node is experiencing reduced functionality based on a determination that health indicators for the particular application service obtained from the logical group of nodes satisfy a consensus threshold; and
  - broadcast, across the plurality of nodes, an indication of reduced functionality for the particular service provided by the particular node.

13. The computing system of claim 12, wherein the logical group of nodes comprises nodes providing one or more application services that have upstream or downstream dependencies with the particular application service provided by the particular node.

14. The computing system of claim 12, wherein the logical group of nodes comprises a consensus system, and wherein the consensus threshold comprises a default consensus threshold of the consensus system.

15. The computing system of claim 12, wherein the processing security is further configured to assign a criticality of the particular application service based on one or more of:
- availability of duplicate application services of the particular application service provided by the plurality of nodes;
- a type of application associated with the particular application service; or
- a number of dependencies of the particular application service.

16. The computing system of claim 12, wherein the logical group of nodes comprises a consensus system, and wherein to verify the that the particular application service is experiencing reduced functionality, the processing circuitry is configured to write an entry in a distributed ledger maintained by the logical group of nodes that includes the indication of reduced functionality for the particular application service provided by the particular node.

17. The computing system of claim 16, wherein the entry in the distributed ledger further includes a criticality indication of the particular application service, wherein the criticality indication comprises one or more of profile information for the particular application service, a priority assigned to the particular application service, a weighting assigned to the particular application service, or a maximum duration of time for which the particular application service can be down.

18. The computing system of claim 16, wherein the processing circuitry is further configured to:
- obtain a second indication that the particular application service provided by the particular node is experiencing restored functionality;
- obtain a second health indicator for the particular application service from each node of the logical group of nodes;
- verify that the particular application service provided by the particular node is experiencing restored functionality based on a determination that second health indicators for the particular application service obtained from the logical group of nodes satisfy the consensus threshold; and
- broadcast, across the plurality of nodes, a restoration indication for the particular service provided by the particular node.

19. The computing system of claim 12, wherein the processing circuitry is further configured to generate data representative of a dashboard user interface for display on an administrator device associated with the network topology, wherein the dashboard includes the indication of reduced functionality for the particular application service provided by the particular node and an indication of a criticality of the particular application service.

20. Non-transitory computer-readable media comprising instructions that, when executed, cause processing circuitry of a computing system including a plurality of nodes arranged in a network topology to:
- obtain an indication that a particular application service of a plurality of application services provided by a particular node of the plurality of nodes is experiencing reduced functionality;
- determine a logical group of nodes of the plurality of nodes that are in communication with the particular application service provided by the particular node, wherein the logical group of nodes includes the particular node;
- obtain a health indicator for the particular application service from each node of the logical group of nodes;
- verify that the particular application service provided by the particular node is experiencing reduced functionality based on a determination that health indicators for the particular application service obtained from the logical group of nodes satisfy a consensus threshold; and
- broadcast, across the plurality of nodes, an indication of reduced functionality for the particular service provided by the particular node.

* * * * *